(12) United States Patent
Albright et al.

(10) Patent No.: US 11,273,748 B2
(45) Date of Patent: Mar. 15, 2022

(54) HIGH THROUGHPUT FORAGE RELOADER

(71) Applicant: MEYERS MANUFACTURING CORPORATION, Dorchester, WI (US)

(72) Inventors: Christopher J. Albright, Abbotsford, WI (US); Samuel N Simmons, Weston, WI (US)

(73) Assignee: Meyer Manufacturing Corporation, Dorchester, WI (US)

( * ) Notice: Subject to any disclaimer, the term of this patent is extended or adjusted under 35 U.S.C. 154(b) by 0 days.

(21) Appl. No.: 17/002,124

(22) Filed: Aug. 25, 2020

(65) Prior Publication Data

US 2021/0070210 A1  Mar. 11, 2021

Related U.S. Application Data

(60) Provisional application No. 62/991,250, filed on Mar. 18, 2020, provisional application No. 62/896,753, filed on Sep. 6, 2019.

(51) Int. Cl.
*B60P 1/36* (2006.01)
*A01D 90/12* (2006.01)
*A01D 90/10* (2006.01)

(52) U.S. Cl.
CPC ............... *B60P 1/36* (2013.01); *A01D 90/10* (2013.01); *A01D 90/12* (2013.01)

(58) Field of Classification Search
CPC .................................. B60P 1/36; A01D 90/10
See application file for complete search history.

(56) References Cited

U.S. PATENT DOCUMENTS

| 2,347,522 | A | * | 4/1944 | Stinnett | B60P 1/36 414/505 |
| 3,302,770 | A | * | 2/1967 | Schwalm | A01D 90/10 198/632 |
| 3,679,081 | A | * | 7/1972 | Duncan, Jr. | B60P 1/36 414/499 |
| 5,221,172 | A | * | 6/1993 | Theurer | E01B 27/00 414/339 |
| 5,718,556 | A | * | 2/1998 | Forsyth | B60P 1/36 198/317 |
| 5,944,469 | A | * | 8/1999 | Theurer | E01B 27/00 414/339 |
| 6,447,238 | B1 | * | 9/2002 | Brown | B60P 1/36 239/672 |
| 6,464,426 | B1 | * | 10/2002 | Girouard | B60P 1/36 404/101 |
| 10,688,902 | B2 | * | 6/2020 | Rexius | B65G 41/002 |
| 2017/0354091 | A1 | * | 12/2017 | Van Mill | B60P 1/42 |

* cited by examiner

*Primary Examiner* — Jonathan Snelting
(74) *Attorney, Agent, or Firm* — Boyle Fredrickson, S.C.

(57) ABSTRACT

A reloader for transferring crops from the field to an over-the-road trailer provides a conveyor chute allowing a straight path from receipt of crop materials to a cantilevered elevated end of the chute allowing extremely high throughput.

19 Claims, 12 Drawing Sheets

HIGH THROUGHPUT FORAGE RELOADER

CROSS REFERENCE TO RELATED APPLICATION

This application claims the benefit of U.S. provisional application 62/991,250 filed Mar. 18, 2020, and U.S. provisional application 62/896,753 filed Sep. 6, 2019, both hereby incorporated by reference.

STATEMENT REGARDING FEDERALLY SPONSORED RESEARCH OR DEVELOPMENT

- -

BACKGROUND OF THE INVENTION

The present invention relates to agricultural equipment for moving forage and the like from the field to long-distance transport and, in particular, to a forage reloader providing simplified robust design.

When forage is harvested, a dedicated harvester may move over a field in a regular pattern accompanied by a field trailer pulled by a tractor or truck. The field trailer receives forage offloaded from the harvester as the two travel together and may shuttle this material to an unload location. When the first field trailer is full, it may pull ahead of the harvester and a second field trailer may take its place for continued harvest operation. After the first field trailer is unloaded, this process is repeated with the first field trailer replacing the second field trailer when the second field trailer is full.

Desirably, the field trailers may have so-called "flotation tires" to provide improved traction on the field and to minimize unwanted compaction of the field. In order to reduce tire wear and to prevent the transfer of mud to the roadway, the field trailers may unload at a "forage reloader" parked near the road. The reloader may receive forage from the field trailers and lift it into a long-distance haul trailer having standard tires.

SUMMARY OF THE INVENTION

The present inventors have recognized that current reloader designs can greatly increase the cost of harvesting through slow reloading that requires additional field trailers to shuttle between the harvesting machine and the reloader or substantially reduced harvesting speeds. Accordingly, the present reloader design provides a substantially straight chute and conveyor allowing material to be transferred at higher speeds from field trailers to over-the-road trailers at flow-rates comparable to the discharge rate from the field trailer. This in turn permits the use of fewer field trailers and/or uninterrupted operation of the harvesting machine.

Specifically, in one embodiment, the invention provides an agricultural reloader for transferring crop materials from a field to an over-the-road trailer and includes a chassis transportable over a field and a conveyor chute extending along a longitudinal axis and supported by the chassis. The conveyor chute has upstanding sidewalls on either side of a bottom wall, the bottom wall providing a conveyor moving material within the conveyor chute over the bottom wall between the sidewalls. The conveyor chute in turn is made up of (a) a first elevator portion pivotally attached at a proximal end to the chassis to allow, in an operating state, elevation of a distal end of the elevator portion over a hopper, and, in a transportation state, to allow lowering of the distal end of the elevator portion against the trailer; and (b) a second receiver portion open to receive crop material downwardly into the receiver portion between the sidewalls and in angled communication with the elevator portion in the operating state. The conveyor operates to move crop materials received in the receiver portion longitudinally through the receiver portion to the elevator portion and out of an open distal end of the elevator portion.

It is thus a feature of at least one embodiment of the invention to provide a "straight-through design" that can maximize transfer rates between shuttle vehicles and over-the-road trailers.

The elevator portion may extend in cantilever beyond an end of the chassis in the operating state.

It is thus a feature of at least one embodiment of the invention to provide a conveyor chute that in an elevated position can discharge directly into an over-the-road trailer without interference from the chassis or the need to remove the conveyor chute from its transport.

The bottom walls of the elevator portion and receiver portion may be substantially coplanar in the transportation state.

It is thus a feature of at least one embodiment of the invention to permit lowering of the center of gravity of the reloader for increased stability during transportation.

The receiver portion may pivot with respect to the elevator portion about a horizontal axis.

It is thus a feature of at least one embodiment of the invention to optimize the receiver portion for receiving crop materials during reloading by allowing it to be positioned independently of the elevator portion.

The chassis may provide at least a left and right side wheel having outer wheel surfaces separated by a trailer width of no more than 8' 6" and wherein the sidewalls of the first elevator portion lie within the trailer width.

It is thus a feature of at least one embodiment of the invention to allow ready transport of the reloader on public highways and roads while maximizing reloading throughput.

The reloader may further include an actuator position between the chassis and a distal portion of the elevator to raise the elevator portion to the operating state of at least 20° upward from horizontal and lower the elevator portion to the transportation state, lower than 10° above horizontal.

It is thus a feature of at least one embodiment of the invention to provide a reloader that can readily accommodate different over-the-road trailers and be quickly reconfigured for transport.

Both the receiver portion and elevator portions of the conveyor chute may be aligned along a common vertical plane when the elevator portion is in the operating state and the transportation state.

It is thus a feature of at least one embodiment of the invention to minimize lateral accelerations of the crop materials as they are transported, for example, caused by bands or curves in the transport path such as can practically reduce the throughput of the conveyor or produce jamming or crop loss.

The sidewalls of the elevator portion may extend upward to a rim having a first separation perpendicular to the longitudinal axis, and the sidewalls of the receiver portion may extend upward to a rim having a second separation perpendicular to the longitudinal axis greater than the first separation.

It is thus a feature of at least one embodiment of the invention to increase the target area for discharge of crop materials into the reloader reducing the time necessary for alignment of the reloader with a field trailer.

The reloader may include an actuator system for moving upper edges of the sidewalls of the receiver portion between a first transverse separation perpendicular to the longitudinal axis for transportation and a second transverse separation distance for receiving crop materials during use.

It is thus a feature of at least one embodiment of the invention to increase the target presented by the receiver portion for fast unloading by side-dumping field trailers while preserving highway transportability of the agricultural reloader.

The sidewalls of the receiver portion may pivot at their lower edge adjacent to the bottom wall, and the actuator system may pivot the sidewalls of the receiver portion inward to more closely align with sidewalls of the elevator portion in a first state and outward to provide a funneling of crop materials toward the bottom wall in a second state.

It is thus a feature of at least one embodiment of the invention to provide a funnel-shaped receiving area that can increase unloading speeds into the receiving portion while preserving a substantially constant width conveyor belt for smooth high-speed reloading.

The receiver portion further may include an upstanding end wall cooperating with the sidewalls of the receiver portion to retain material against escaping between the sidewalls of the receiver portion and the end wall.

It is thus a feature of at least one embodiment of the invention to provide high-speed unloading possible through a dumping action into the receiving portion. The end wall provides a three-sided compartment preventing loss of materials that transfer quickly down into the receiving portion.

The end wall may communicate with the sidewalls of the receiver portion through shield portions to allow movement between the sidewalls of the receiver portion and end wall while preventing the escape of materials between the sidewalls of the receiver portion and end wall with movement of the sidewalls of the receiver portion. The sidewalls of the receiver portion may further include shield portions to allow movement between the sidewalls of the receiver portion and sidewalls of the elevator portion while preventing the escape of material between the sidewalls of the receiver portion and sidewalls of the elevator portion.

It is thus a feature of at least one embodiment of the invention to provide for an expandable receiver area consistent with retaining crop materials when expanded.

The shield portions may describe regions of overlap between the end wall and sidewalls of the receiver area.

It is thus a feature of at least one embodiment of the invention to provide a continuous surface resistant to catching debris yet expandable without flexible material subject to damage, tearing, or the like.

The conveyor may provide a continuous portion of a conveyor loop extending over the bottom wall of the elevator portion and receiver portion.

It is thus a feature of at least one embodiment of the invention to eliminate dead spots or clogging that would slow the operation of the conveyor in providing rapid transfer of material.

The chassis may provide a tractor hitch for connecting the chassis to a tractor to draw the chassis over a field.

It is thus a feature of at least one embodiment of the invention to eliminate the need for an integrated engine and drivetrain in the reloader, recognizing the ability of the field trucks and over-the-road trucks to accommodate a given position of the reloader.

The tractor hitch may extend longitudinally from an end of the chassis proximate to the receiver portion and may be mounted to retract longitudinally toward the chassis when the receiver portion is not in use. In addition, or alternatively, the reloader may include bumpers extending from the chassis at an end of the chassis supporting the receiver end, the bumpers sized to limit travel of vehicles discharging crop materials into the receiver end moving longitudinally toward the receiving end.

It is thus a feature of at least one embodiment of the invention eliminate interference between the field trailers and/or to provide a positive stop for trailers backing up to the reloader for faster unloading.

These particular objects and advantages may apply to only some embodiments falling within the claims and thus do not define the scope of the invention.

DETAILED DESCRIPTION OF THE PREFERRED EMBODIMENT

Figure 1:
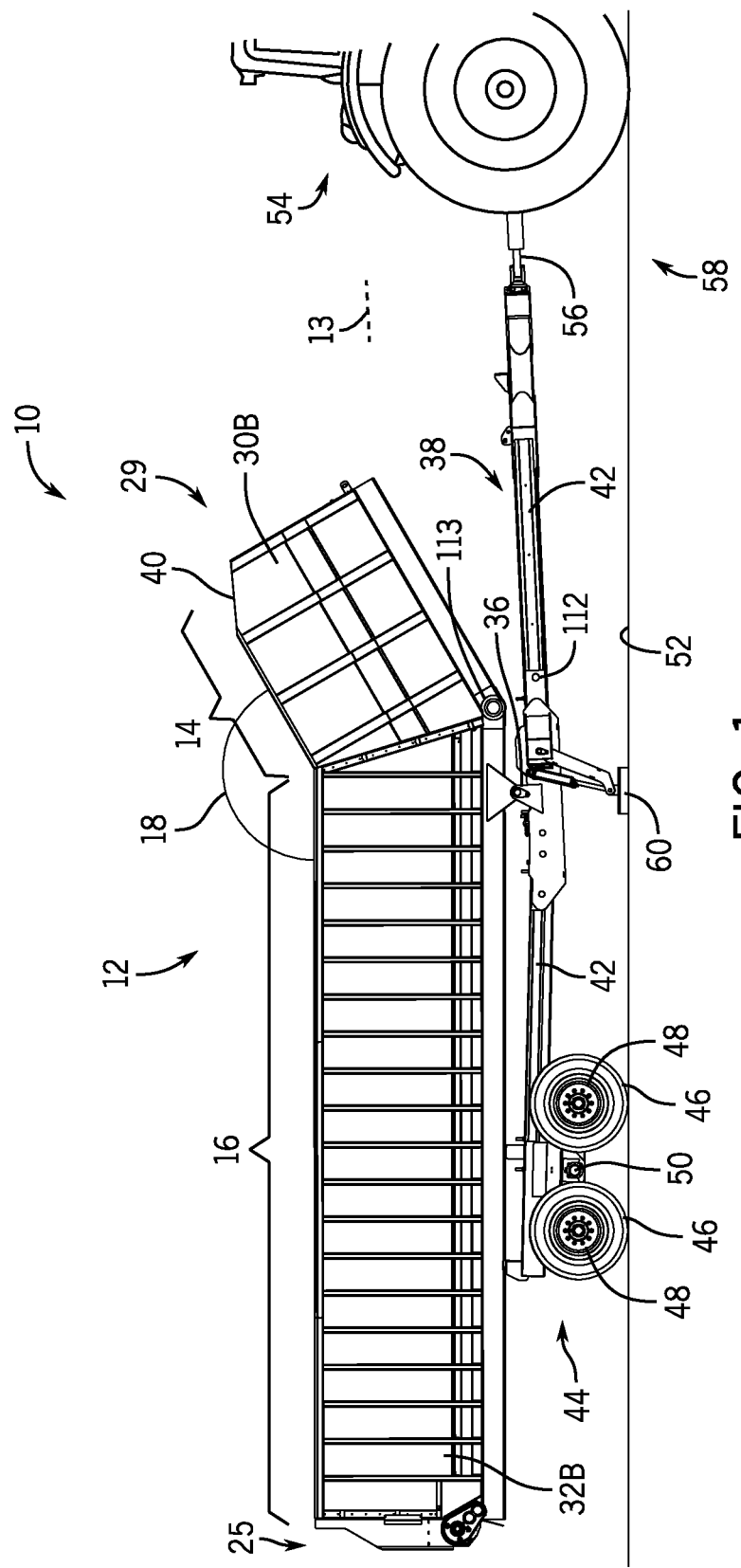
FIG. 1 is side elevational view of the reloader as attached to a tractor for moving the reloader between various unloading locations and showing stabilizer feet in an extended position to assist in connecting and disconnecting a hitch of the reloader trailer and showing the two-angle chute in a first configuration for transport on its trailer.
Figure 5:
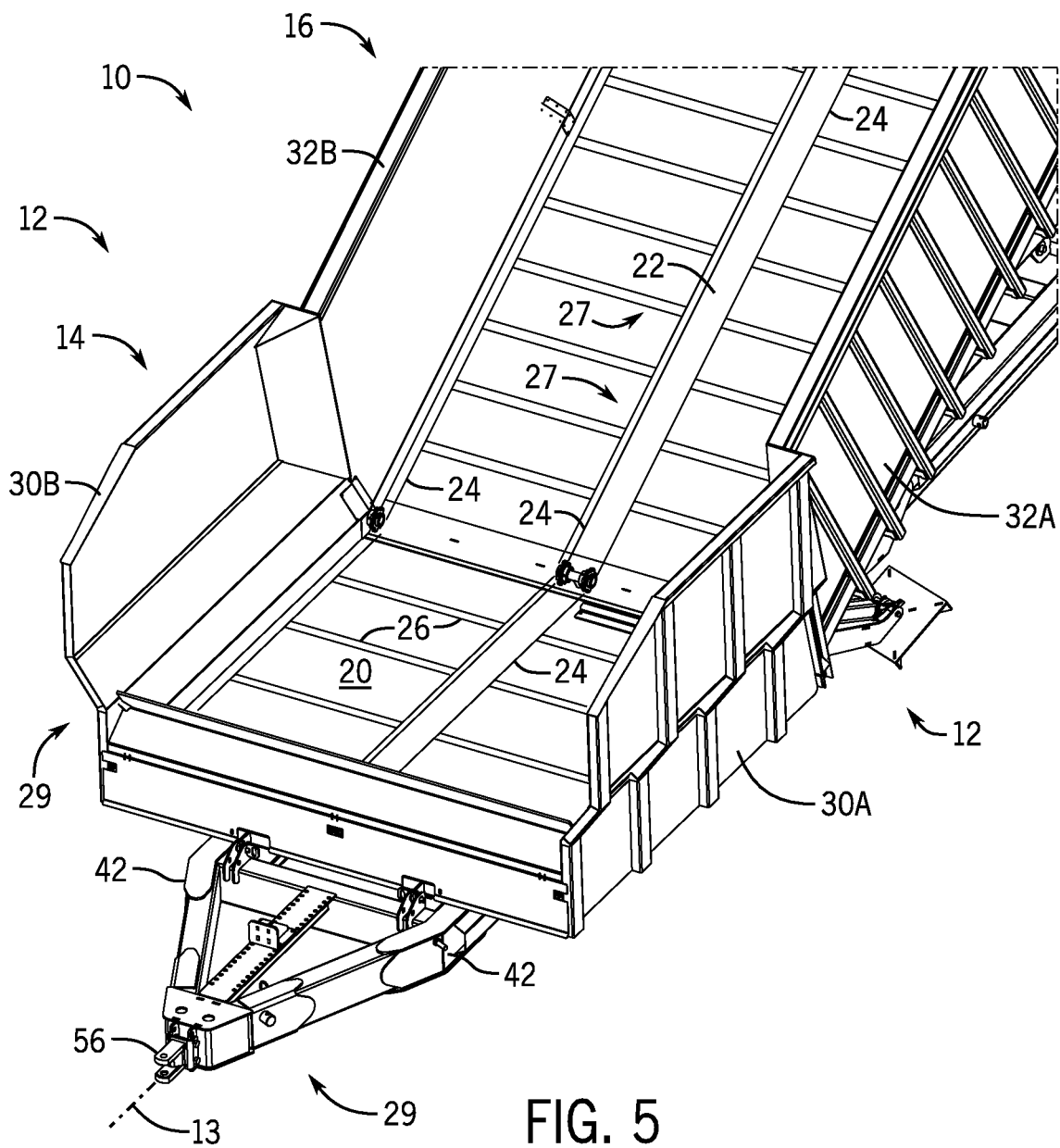
FIG. 5 is a perspective view of a hitch and of the reloader such as may fit between the tires of a field trailer unloading to the reloader.

Referring now to FIGS. 1 and 5, a reloader 10 of the present invention may provide for a reloader box 12 extending generally along a trailer axis 13 and having a first short chute portion 14 connected to and axially aligned with a long chute portion 16 at an upwardly obtuse fixed angle 18 of approximately 150°. In one embodiment, the long chute portion 16 may be approximately three times the length of the short chute portion 14.

Each of the short chute portion 14 and long chute portion 16 provide bottom walls 20 and 22, respectively, having overlying conveyor chains 24 extending along the trailer axis 13 and having cross paddles 26 (angle irons) so that this movement of the conveyor chains 24 carries forage (not shown) from an open front end 29 of the short chute portion 14 along the bottom wall 20 out of the short chute portion 14 and into the long chute portion 16 along the bottom wall 22 and out of a second rear end 25 during use. The bottom walls 20 and 22 are flanked on left and right sides (in opposition along an axis perpendicular to the trailer axis 13) by upstanding sidewalls 30A and 30B for the short chute portion 14 and upstanding sidewalls 32a and 32b for the long chute portion 16.

Referring again to FIG. 1, in one embodiment, the short chute portion 14 and long chute portion 16 of the reloader box 12 pivot together with respect to a trailer 38 at their junction. This pivoting is about a horizontal pivot axis 36 generally perpendicular to trailer axis 13. In a transport position as shown in FIG. 1, the long chute portion 16 may lie substantially flat against the upper surface of the trailer 38 with the short chute portion 14 tipped upward by about 30°. Because the short chute portion 14 is short, the elevation of the highest point of the short chute portion 14 is sufficiently tow to allow reloader 10 to pass under standard highway bridges and the like. An uppermost corner 40 of upstanding sidewalls 30 of the short chute portion 14 in this position may be truncated along a horizontal plane to minimize this height of the reloader 10.

The trailer 38 may provide for a pair of parallel continuous beams 42, for example, tubular steel, extending along the trailer axis 13. These beams 42 start at a rear end 44 beneath the long chute portion 16 (so that the long chute portion 16 cantilevers slightly rearward of the trailer 38 by approximately one third of its length) and proceed forward to a hitch 56. The rear end 44 of the beams 42 attaches to a left and right side wheel pair 46 fitted with flotation tires 48. Each wheel pair 46 may be mounted as a unit to pivot about horizontal axis 50 with respect to the beams 42 of the trailer 38 so that the angle of the beams 42 above the ground 52 may be varied while both tires 48 are supported on the ground 52 and further may accommodate variations in the terrain as the trailer 38 is pulled, for example, by a tractor 54 attached to the hitch 56 at a front end 58 of the beam 42 and pulling the reloader 10 along the trailer axis 13.

When the reloader 10 is positioned at a location for use, left and right stabilizer feet (only one visible in FIG. 6) may pivot downward to contact the ground 52 and hold the beams 42 in a substantially horizontal orientation with the hitch 56 above the ground 52 to assist in disengaging the hitch 56 from the tractor 54. Each stabilizer foot 60 may attached to a swing arm 62 pivoting about a horizontal axis 64 with respect to a beam 42 as driven by a hydraulic cylinder 66. Preferably the feet 60 contact the ground 52 approximately directly below the pivot axis 36.

Figure 2:
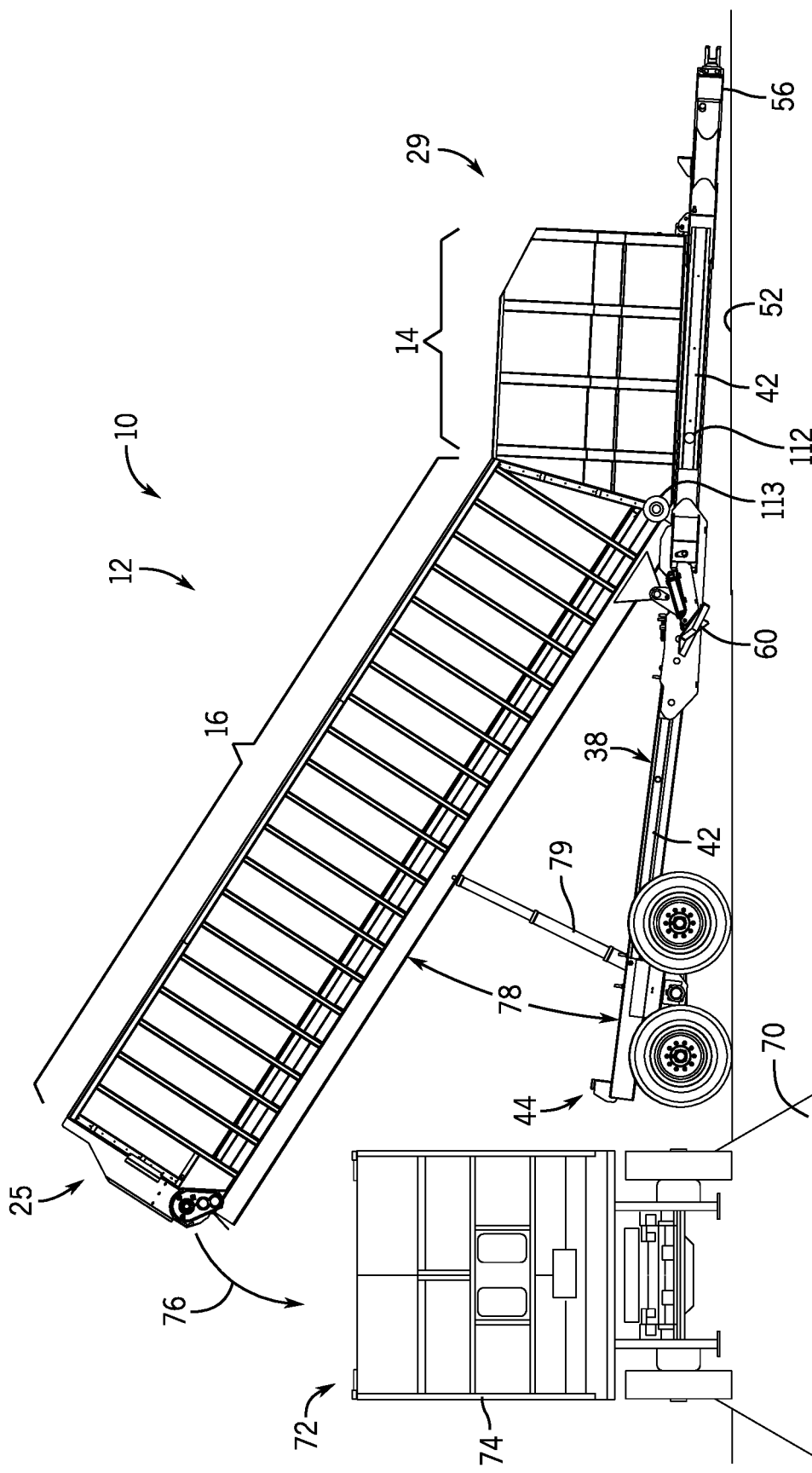
FIG. 2 is a figure similar to that of FIG. 1 showing the chute in a second configuration for unloading into a long distance haul trailer, the chute as elevated from the trailer by a hydraulic cylinder and with the stabilizer feet in the retracted position to lower the hitch point of the trailer against the ground out of the way of unloading trailers.
Figure 3:
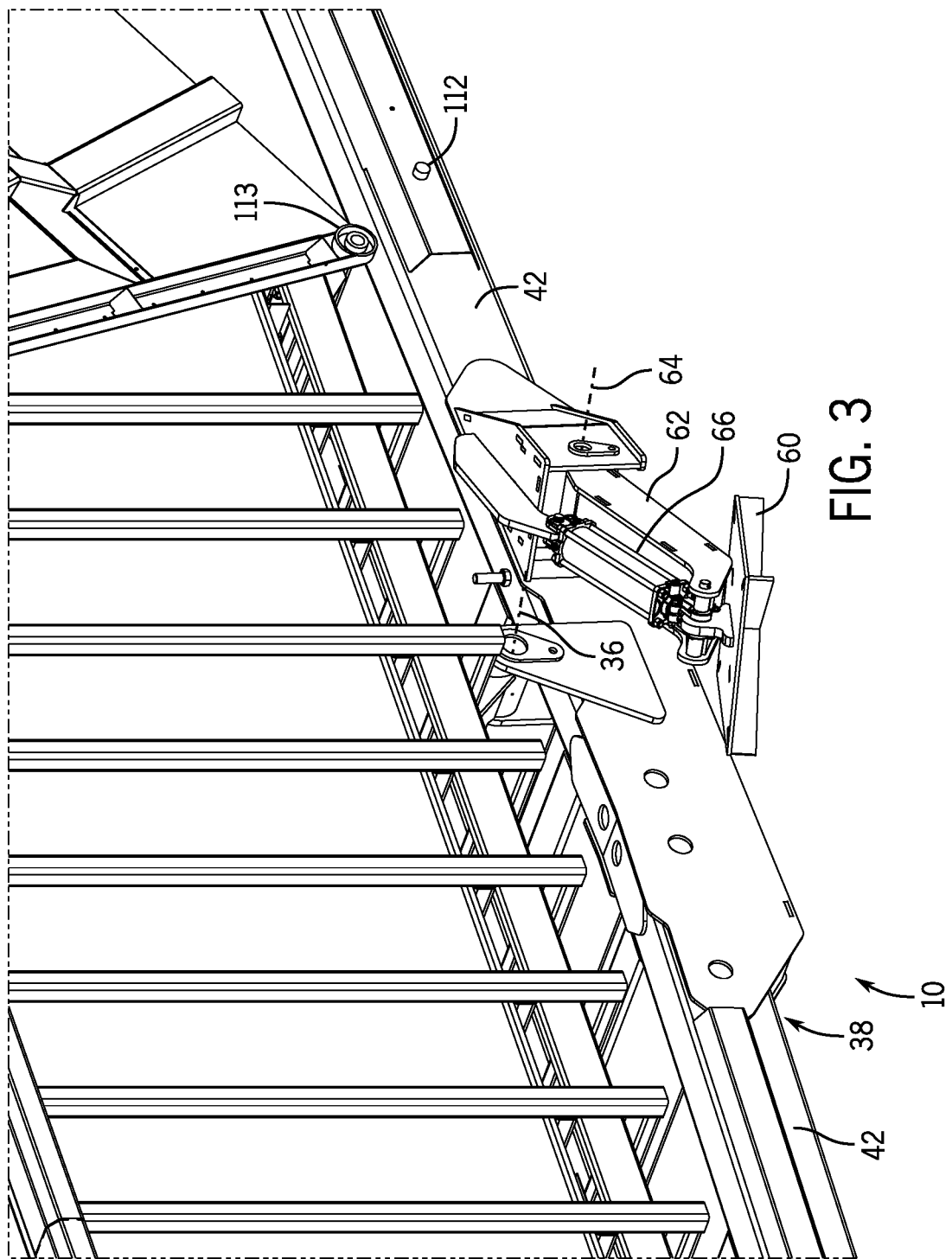
FIG. 3 is a fragmentary view of the reloader showing the hinge point between the chute and the trailer and showing the stabilizer feet in the retracted position.

Referring now to FIG. 2, in use, the reloader 10 may be positioned near a paved road 70 that may provide support for a long distance haul trailer 72, for example, the latter having an upwardly open container 74. This upwardly open container 74 may receive forage as indicated by arrow 76 out of the rear end 25 of the long chute portion 16 when the long chute portion 16 is raised to an angle 78 of approximately 30° so that the short chute portion 14 now rests in horizontal orientation against the beams 42 of the trailer 38. This position may be reached by activation of a hydraulic cylinder 79 passing between the trailer 38 and the under surface of the long chute portion 16.

Prior to elevating the tong chute portion 16, the tractor 54 may be removed and the stabilizer foot 60 raised so that the hitch 56 rests on the ground slightly increasing the angle of elevation of the long chute portion 16 and bringing the front end 29 of the short chute portion 14 close to the ground 52. The cantilevered portion of the long chute portion 16 extending beyond the trailer 38 allows the rear end 25 to be positioned above the container 74 without interference between the long-distance haul trailer 72 and the trailer 38.

Figure 4:
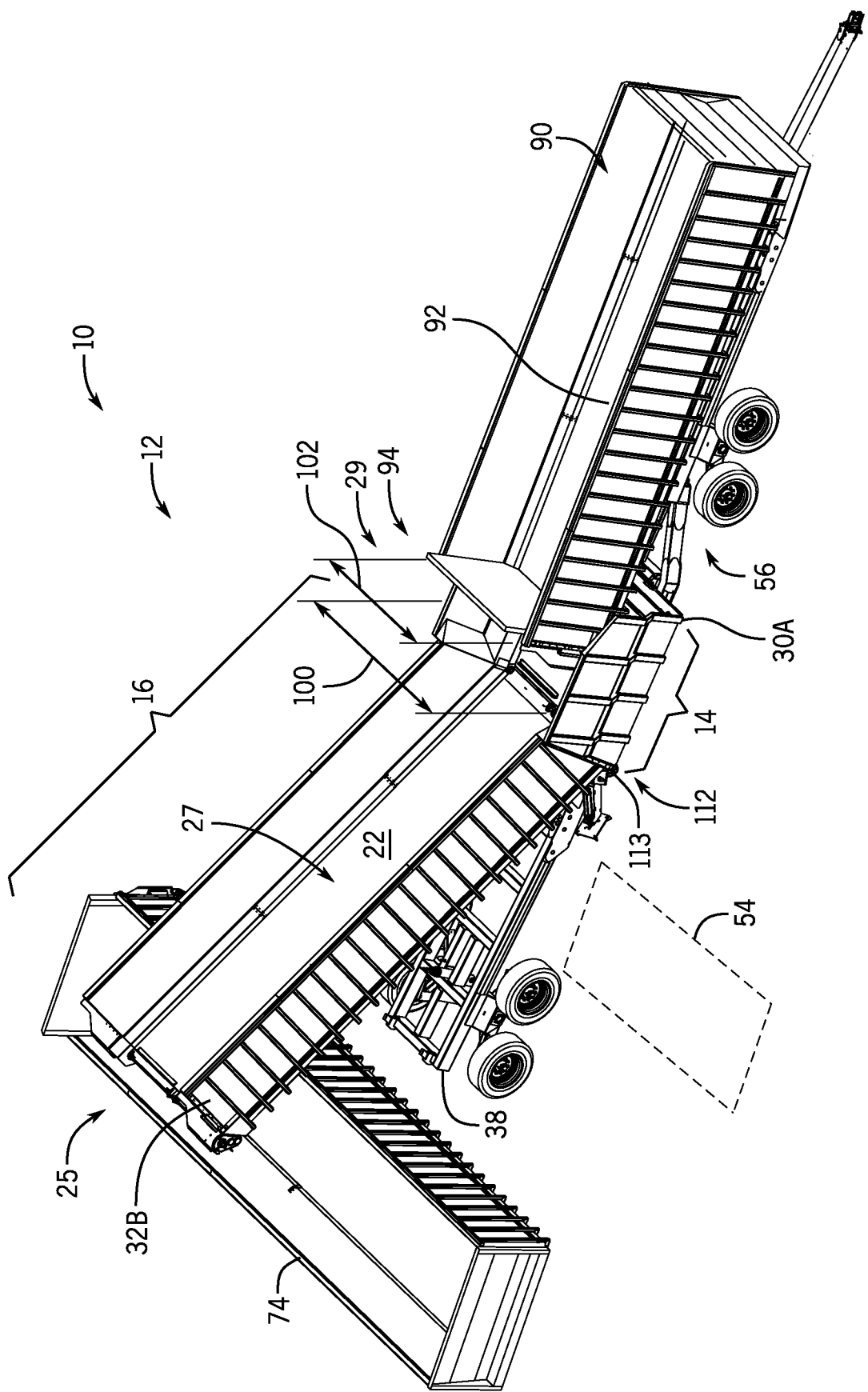
FIG. 4 is a figure similar to FIG. 2 in perspective showing a width of a short leg of the two-angle chute to readily receive a rear of a trailer for unloading; and showing positioning of a tractor used to transport the reloader to a side position for providing power to the reloader.

Referring now to FIGS. 5 and 4, a field trailer 90, for example, may have a chain conveyor 92 for discharging contained forage from a rear end 94 of the field trailer 90. This rear end 94 may be over the short chute portion 14 by backing the field trailer 90 over the hitch 56 within the short chute portion 14 so that the sidewalls 30 flank the left and right side of the field trailer's 90 rear end 94. In this respect, the separation 100 between the sidewalls 30 of the short chute portion 14 is wider than corresponding width 102 of the field trailer 90, for example, by several feet on each side, greatly simplifying the alignment process. The tractor 54 may be positioned, as indicated by the dotted line, to connect to the tractor 54 hydraulic system or to a power take-off coupling 113 (shown in FIG. 6). The power take-off coupling or a hydraulic motor connects to a gearbox (not shown) which operates the chain conveyor 27 to move forage over the bottom walls 20 and 22 of the short chute portion 14 and long chute portion 16 in a straight line so that forage is rapidly conveyed through the reloader box 12 and into the container 74 at, the same speed without bunching or backing up. The use of a power take-off coupling 113 receiving mechanical power directly from a tractor or the like provides extremely high-speed conveying that can keep up with forage rapidly discharged from the field trailer 90 not possible with typical hydraulics, although hydraulics are an alternative that may be used for convenience. A separate hydraulic connection 112 can provide power to the hydraulic cylinder 79 and the hydraulic cylinder 66 operating the stabilizer feet 60. Alternatively, it will be appreciated that the hydraulic cylinder 79 and hydraulic cylinder 66 may be replaced by mechanical or electrical equivalents, the former driven by the power take-off coupling 113.

Figure 6:
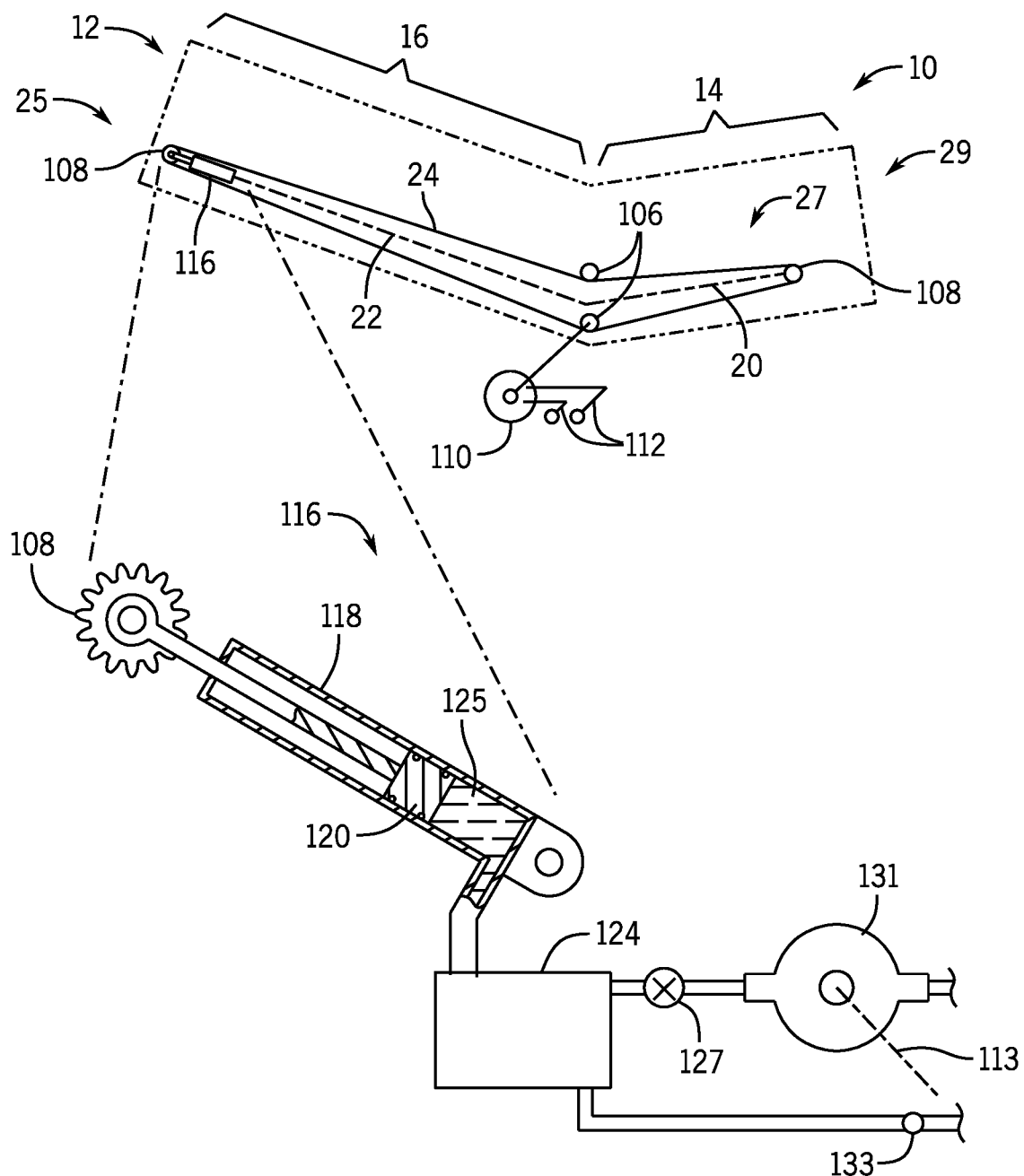
FIG. 6 is a simplified diagram of the continuous chain of the reloader simplifying movement of the chute and providing high throughput by means of a continuous chain with no dead spots.

Referring now to FIG. 6, a chain conveyor 27 may provide for multiple loops of chain 24 separated as one moves left to right along the bottom walls 20 and 22. Each loop of chain 24 may have an upper portion of each loop passing over the bottom walls 20 and 22 and lower portions returning under the bottom walls 20 and 22. The chain 24 must follow the mutually angled bottom walls 20 and 22, and this path may be enforced by idler sprockets 106 at the junction between the short chute portion 14 and long chute portion 16 positioned over the chains 24 above and below the bottom walls 20 and 22 and located between end sprockets 108 positioned at a front end 29 and rear end 25 of the reloader box 12, respectively. One of the sprockets 106, for example, lower sprocket 106, may connect to the hydraulic motor 110 which can be coupled by means of connectors and hoses 112 to a hydraulic pump on the tractor 54 for operation of the reloader 10. An automatic chain tensioner 116 may be used to accommodate the long length of the chain loops 24 and to keep chain slack to a minimum. In one embodiment, the automatic chain tensioner 116 may push the end sprocket 108 toward the rear end 25 as indicated although other positions may be used as is generally understood in the art. The automatic chain tensioner 116 may provide for a hydraulic cylinder 115 having an internal piston 120 movable within the cylinder 115 to move the sprocket 118 to provide tension on the chain 24 proportional to the pressure of hydraulic fluid 125 pressing on the piston 120. A constant force of compression may be obtained by using an accumulator 124, for example, having an air bladder or the like in the volume, much more (greater than 10 times) than the volume of the cylinder 115, to provide a source of substantially constant hydraulic pressure and hence constant force on the sprocket 108. In some embodiments, the accumulator 124 may be charged and then a valve 127 opened to seal the pressure within the accumulator 124. In an alternative embodiment, the accumulator 124 may be driven by a hydraulic pump 131, for example, driven by the power take-off coupling 113 to provide a substantially constant source of hydraulic pressure by charging the accumulator 124 to a pressure determined by a relief valve 133 returning hydraulic fluid from the accumulator 124 to a point upstream from the hydraulic pump 131.

Referring now to FIGS. 7a-7d, in an alternative embodiment, the short chute portion 14 may be fixed with respect to the beam 42 to maintain a generally horizontal orientation with the bottom of the short chute portion 14 adjacent to the beam 42 and substantially horizontal as supported by the upper surface of the trailer 38. In contrast, the long chute portion 16 may pivot independently about horizontal pivot axis 36 with respect to the trailer 38 and with respect to the short chute portion 14 so that the rear end 25 of the long chute portion 16 may rise to various elevation distances 28 above the ground 52 to accommodate different heights of containers 74 on haul trailers 72 (shown in FIG. 2) as driven by hydraulic cylinder 79. In this way, the short chute portion 14 maintains a steady elevation to receive material independent of the elevation distance 28.

In order to facilitate this separate angulation of the short chute portion 14 and the long chute portion 16, chain 24 may be broken into two sections looping synchronously in short chute portion 14 and long chute portion 16 joined only by sprockets on a common shaft.

The short, chute portion 14 may include rearwardly extending shields 37 that fit inside of corresponding sidewalls 32 of the long chute portion 16 to prevent spillage of material transferring between the short chute portion 14 and the long chute portion 16 at any of various angles 78.

Figure 8:
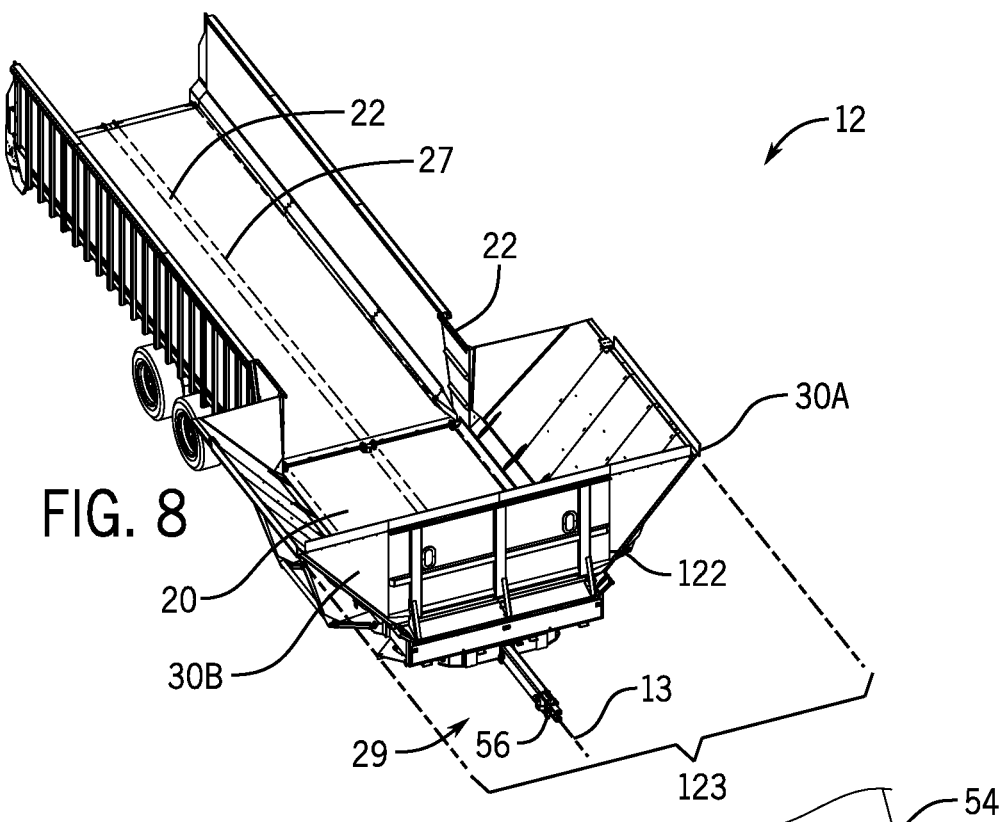
FIG. 8 is a perspective view of the reloader of FIG. 7a showing sidewalls of the front end of the chute in an open position for accommodating side dump carts.
Figure 9:
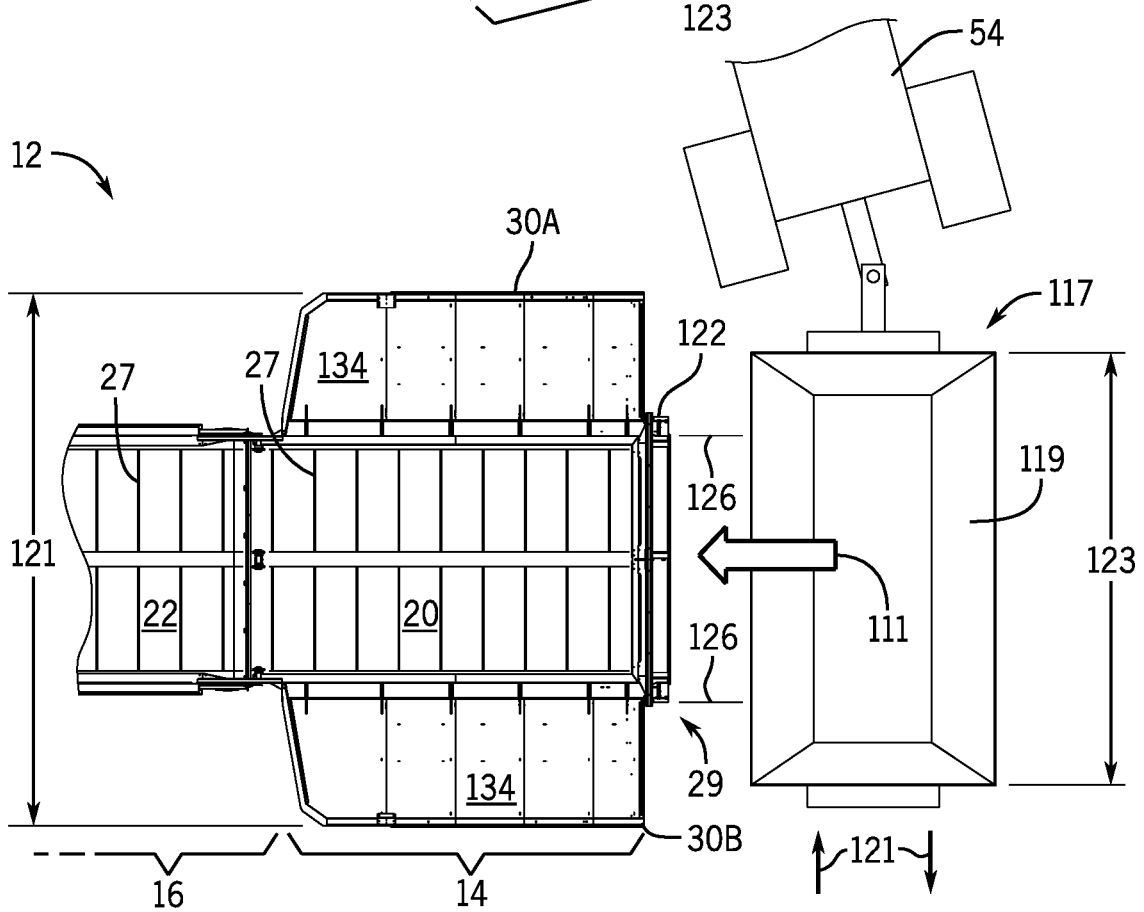
FIG. 9 is a top plan fragmentary view of the reloader of FIGS. 7 and 8 showing positioning of a side dump cart for discharge into the front end of the chute.

Referring now to FIGS. 8 and 9, the present invention may be adapted for use with side discharge dump carts 117 of the type having an upwardly open hopper 119 supported on a trailer or the like (not visible) such that the hopper 119 may be elevated and tipped to discharge material 111 (as indicated by the arrow in FIG. 9) into the short chute portion 14. Examples of such dump carts 117 include the OXBO 3524 commercially available from OXBO International Corporation.

When using a side discharge dump cart 117, the material 111 is discharged over an upwardly extending front wall 122 at the front end 29 of the short chute portion 14 that joins the front edges of upstanding sidewalls 30a and 30b to maintain the material within the sidewalls 30a, 30b, and front wall 122. This orientation of discharge allows the dump cart 117 to be drawn alongside of the front end 29 of the reloader box 12 from either of two directions 121 as pulled by tractor 54. Importantly, this means that the reloader 10 may be used without backing up the truck, a time-consuming and difficult operation. This area of travel of the tractor 54 and the dump cart 117 for this and the previous embodiment may be protected, for example, by a ground protection mat or other similar structure to prevent the creation of deep ruts in the field in this area.

In this embodiment the sidewalls 30a and 30b may move between an open configuration in which they splay outward (for example, by about 45 degrees) as they extend upward to provide a funneling of material from the hopper 119 into the short chute portion 14. This splaying also provides a lateral separation 123 of the upper edges of the sidewalls 30a and 30b to a width larger than a length 123' of the hopper 119 to allow capture of material from the hopper 119.

Figure 10A:
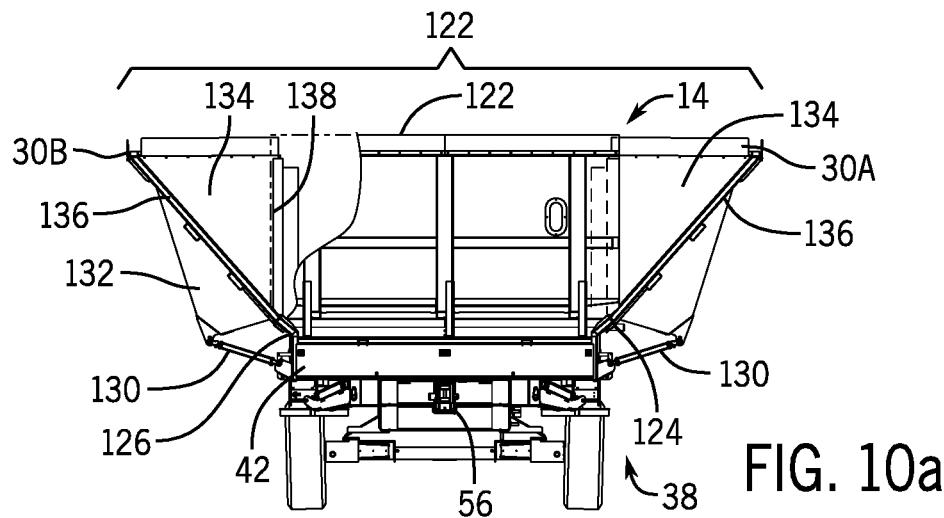
FIGS. 10a-10c are front elevational views of the reloader of FIGS. 7-9 showing an inward folding of the sidewalls for transport.
Figure 10B:
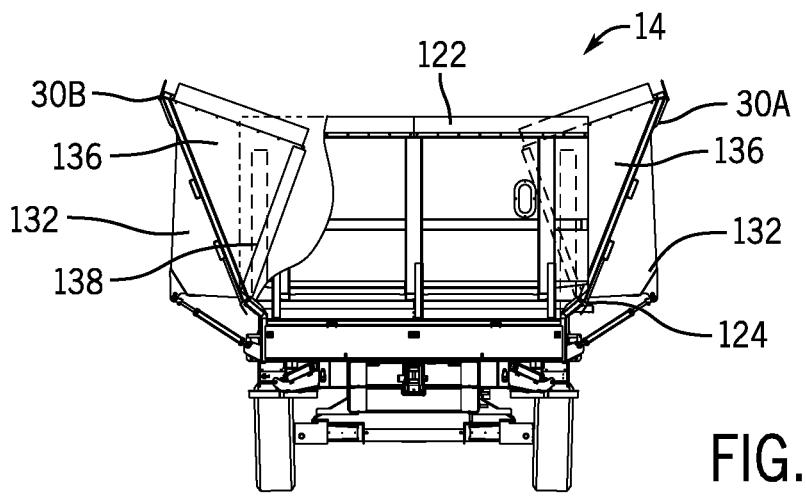
Figure 10C:
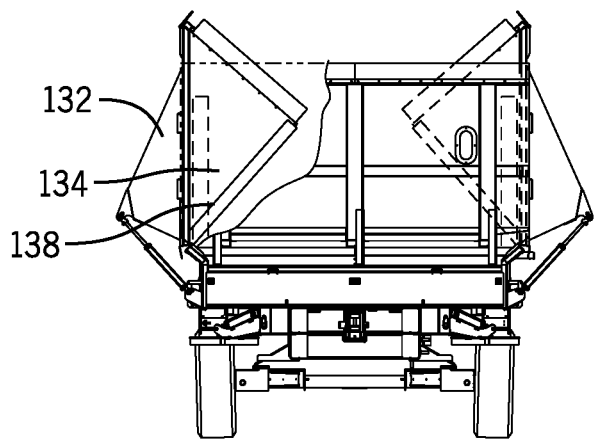

Referring now also to FIGS. 10a-10c, for transportation of the reloader box 12, the sidewalls 30a and 30b may pivot at their point of attachment to the beam 42 of the trailer 38 along pivot axes 126 (generally parallel to trailer axis 13) from the open position shown in FIG. 10a through the position shown in FIG. 10b to a closed position shown in FIG. 10c. In the closed position, the lateral separation 123 of the upper edges of the sidewalls 30a and 30b is reduced until those upper edges touch as shown in FIG. 10c. This motion may be driven by pairs of hydraulic cylinders 130 positioned on each side of the short chute portion 14 extending between the beams 42 and attachment extensions 132 extending laterally from the outside of the sidewalls 30a and 30b to allow this full closure without interference. Desirably, in the closed position, the sidewalls 30a and 30b will have a lateral separation 123 of less than 8 feet, 6 inches to allow use on highways without special dispensation. Generally, the width of the chute, and in particular of the bottom wall, will be at least 6 feet and desirably at least 8 feet to maximize usable conveyor volume.

The sidewalls 30a and 30b each include axially and upwardly extending side panels 134 each having two laterally, inwardly extending triangular end walls 136 at their front and rear edges. These triangular end walls 136 each have a hypotenuse edge attached to the inner surface of the panels 134 and, in an open position (shown in FIG. 10a), a vertically extending base 138. As the sidewalls 30a and 30b close, the base 138 swings inward to a horizontal position to abut the upper surface of the bottom wall 20. When the sidewalls 30a and 30b are fully open (shown in FIG. 10a) the front-most bases 138 vertically align with the corresponding vertical edges of the front wall 122 preventing loss of material between the front wall 122 and the triangular walls 136.

Figure 11:
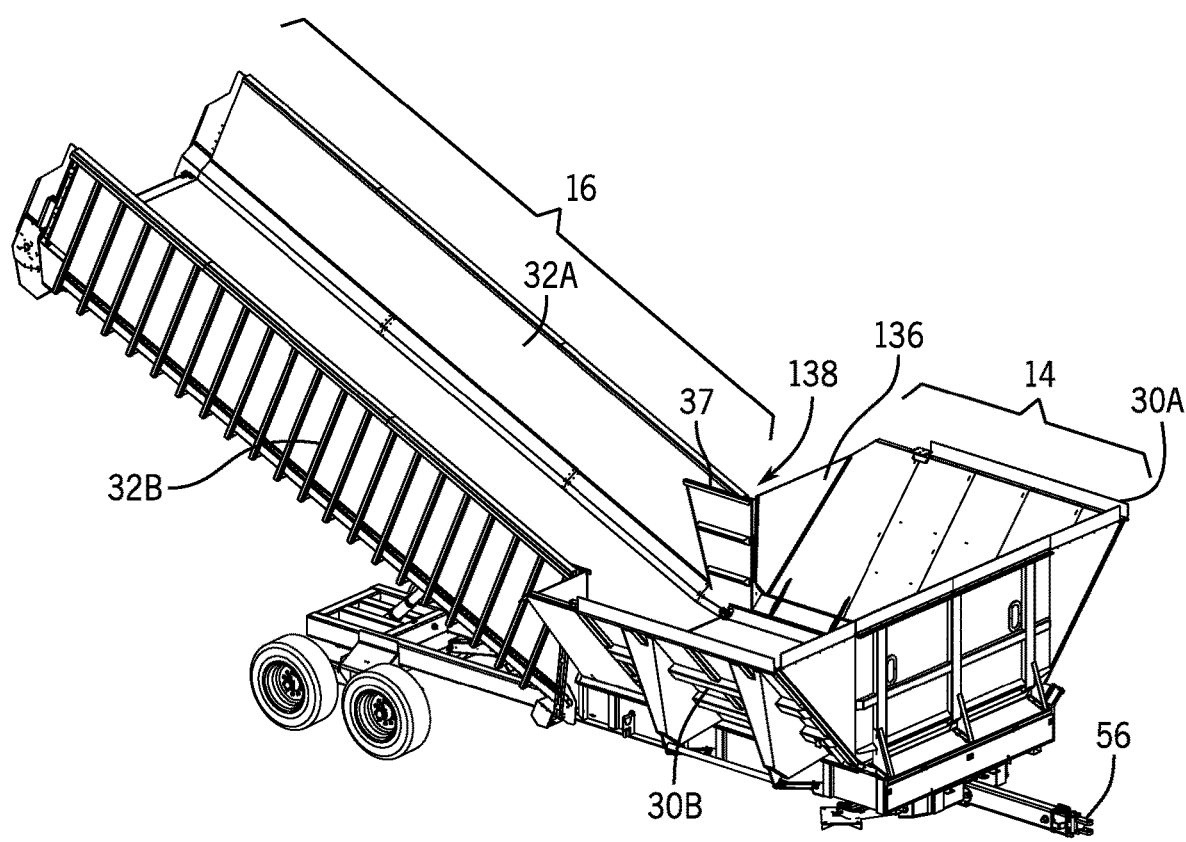
FIG. 11 is a figure similar to that of FIG. 8 showing the rear chute portion in different elevated positions with different angulations with respect to the front portion of the chute, this changing angle accommodated by rearwardly extending shields from the front portion of the chute.

Referring now also to FIG. 11 the rear triangular walls 136 closest to the long chute portion 16 provide a base 138 that aligns with the front edge of the upstanding vertical sidewalls 32a and 32b to prevent the escape of material from the short chute portion 14 as it passes through the long chute portion 16. The rear bases 138 on each side also support the shields 37 described above with respect to FIG. 7 and extend inside and parallel to the sidewalls 32 of the chute portion 16.

It will be appreciated that this ability to move the sidewalls 30a and 30b may also be employed with respect to the embodiment of FIGS. 1-6 where the movement is used to reduce the height of the vertically extending sidewalls 30a and 30b by folding them inward rather than to significantly reducing the width of the short chute portion 14.

Figure 12:
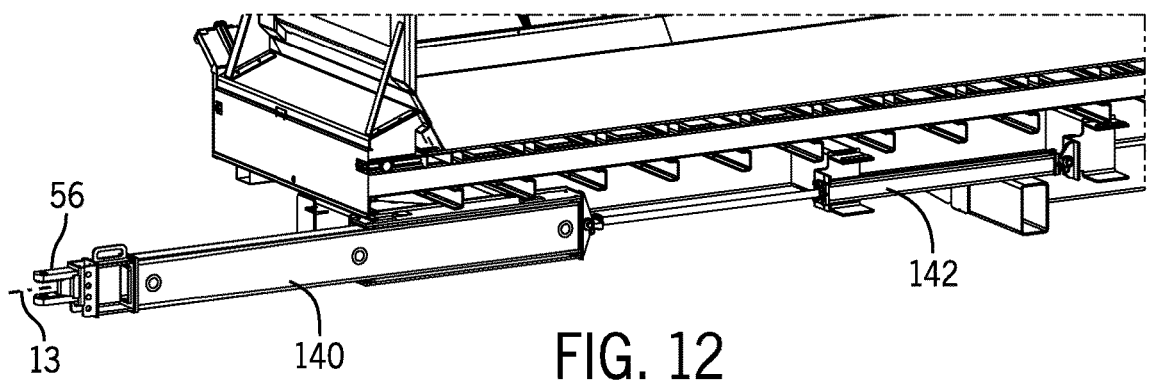
FIG. 12 is a cross-sectional fragmentary view of the front of the reloader showing a telescoping hydraulically-driven hitch.

Referring now to FIGS. 9 and 12, in one embodiment the hitch 56 may be positioned on a telescoping tongue bar 140 extending along trailer axis 13 driven by hydraulic cylinder 142. In this way, the hitch 56 may be drawn inward during use of the reloader box 12, for example, as shown in FIG. 9 to prevent interference with the cart 117.

Figure 13:
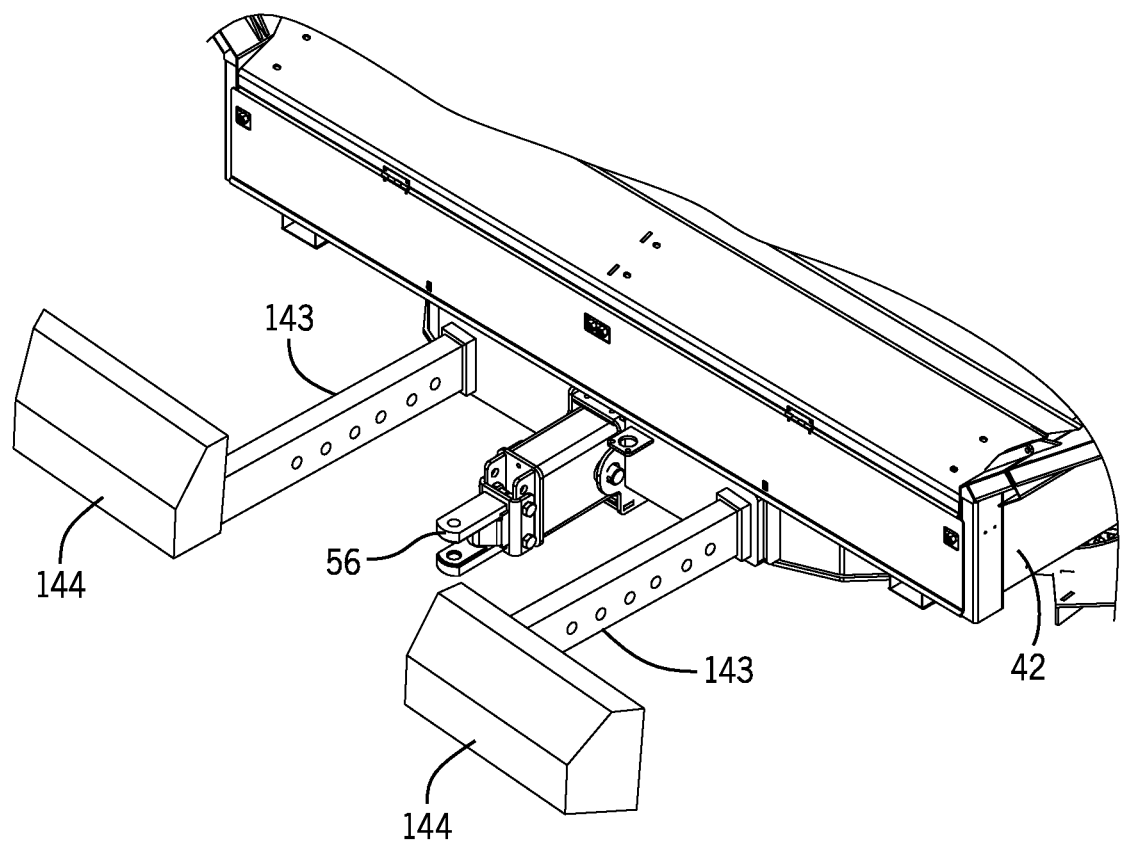
FIG. 13 is a fragmentary front view of the reloader showing telescoping wheel stops.
Figure 14:
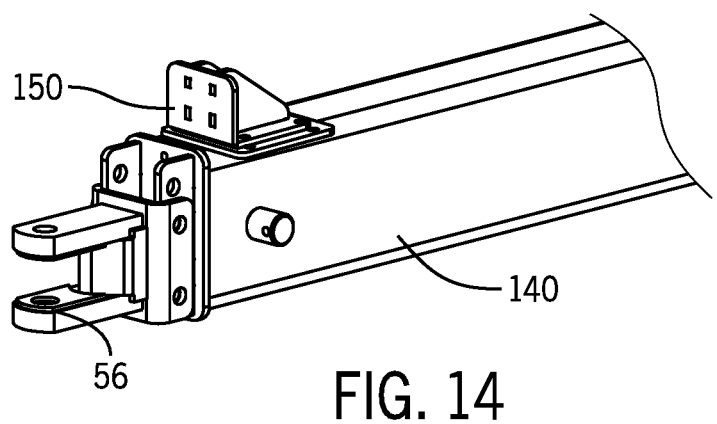
FIG. 14 is a detailed fragmentary view of a hitch having a stop plate on the tongue bar for positioning a rear discharge trailer.

Referring now to FIG. 13, similar telescopic, rearwardly extending bumper bars 143 may be placed on either side of the hitch 15 also driven by hydraulic cylinders (not shown) and terminating in wheel bumpers 144 sized and adjusted in elevation to contact the wheels of the field trailer 90 when unloading, as shown in FIG. 4, into the short chute portion 14 to simplify this alignment process. Alternatively, as shown in FIG. 14, a stop plate 150 may be attached to the tongue bar 140 to contact the corresponding stop plate structure on the trailer 90 (not shown) again for use in the configuration shown in FIG. 4. Either or both of the stop plate 150 and wheel bumpers 144 may have an outer facing of elastomeric material.

Either or both of these systems of FIGS. 13 and 14 may be augmented by electronic proximity sensors or the like providing a visual or audible warning to the driver of the field trailer 90 when proper positioning has been obtained along trailer axis 13. In one embodiment the proximity sensors may sense a rear end of the trailer received within the short chute portion 14 by a desired overlap amount, for example, with photodetectors producing a beam across the sidewalls 30. A lamp on a post or the like visible to the driver or a radio sensor within the cab may be used to alert the driver of the discharge vehicle of proper position independent of mud and debris on the rearview mirrors of the cab.

Figure 15:
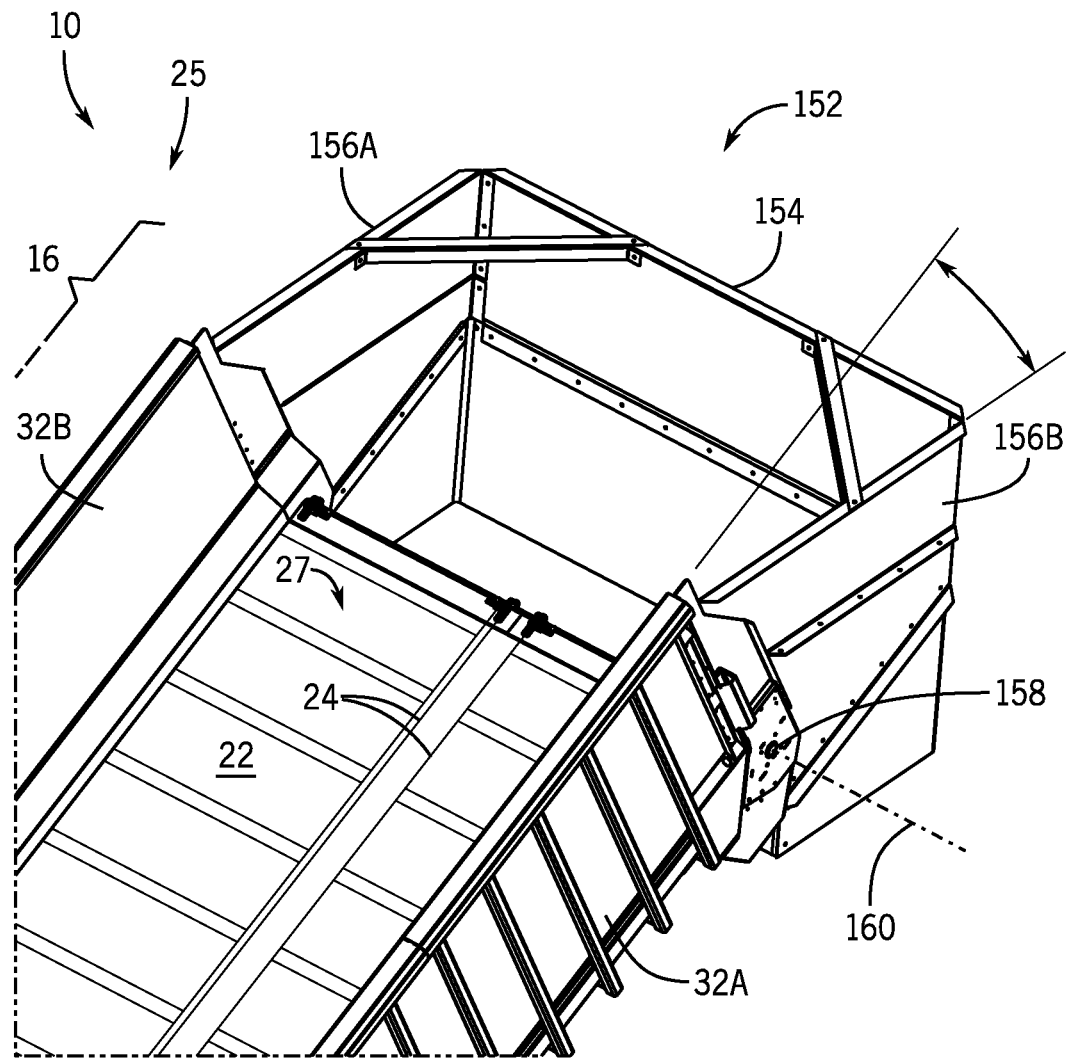
FIG. 15 is a perspective fragmentary view of a rear of the elevator chute in the elevated position as attached to an optional downward chute for guiding material into an over the road trailer.

Referring now to FIG. 15, an optional down chute 152 may be attached to the rear end 25 of chute portion 16 to be positioned over the container 74 (for example, shown in FIG. 4) during the discharge of material into container 74. In this regard, the down chute 152 provides a downwardly open rectangular box having a front side removed for receiving material transported by the chain conveyor 27 rearwardly along the chute 16 and over its rear edge 25. The down chute 152 serves to better channel this material downwardly into the container 74.

Figure 7A:
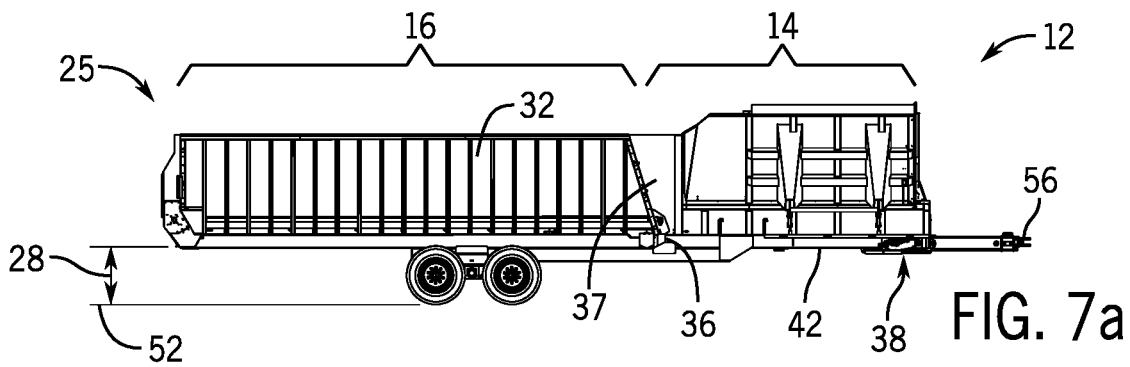
FIGS. 7a-7d are side elevational views of an alternative embodiment of the reloader showing positioning for different height transport trailers and showing a front receiving end of the chute adapted for side dump carts.
Figure 7B:
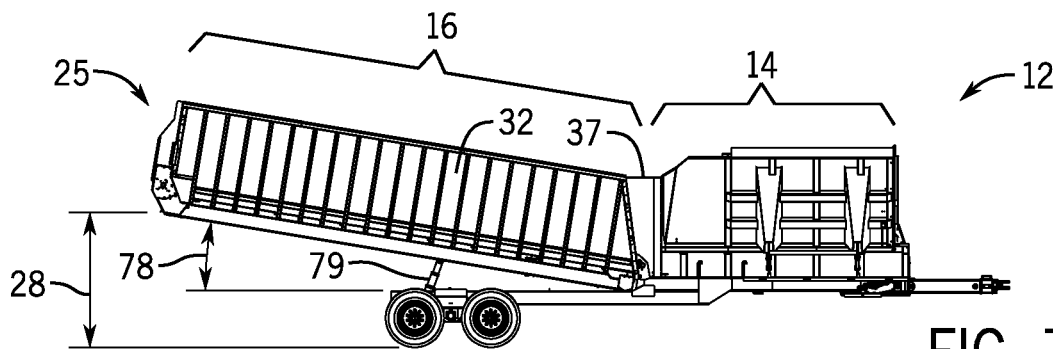
Figure 7C:
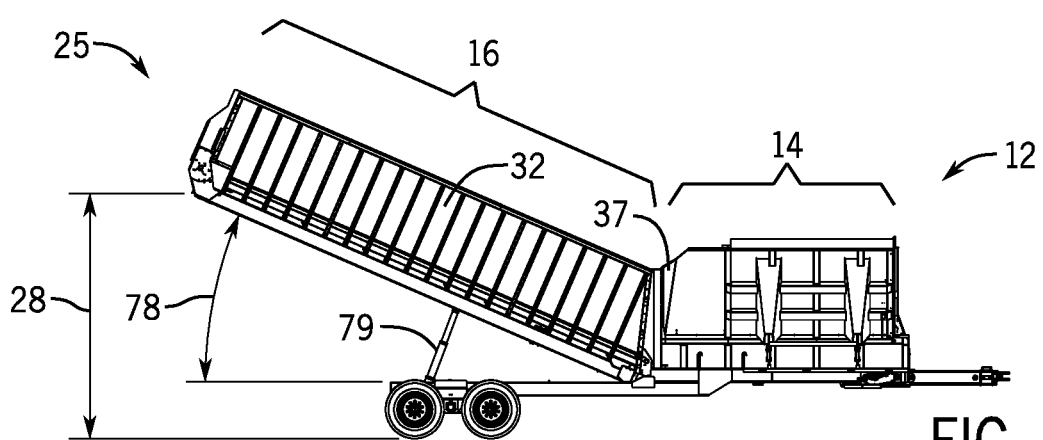
Figure 7D:
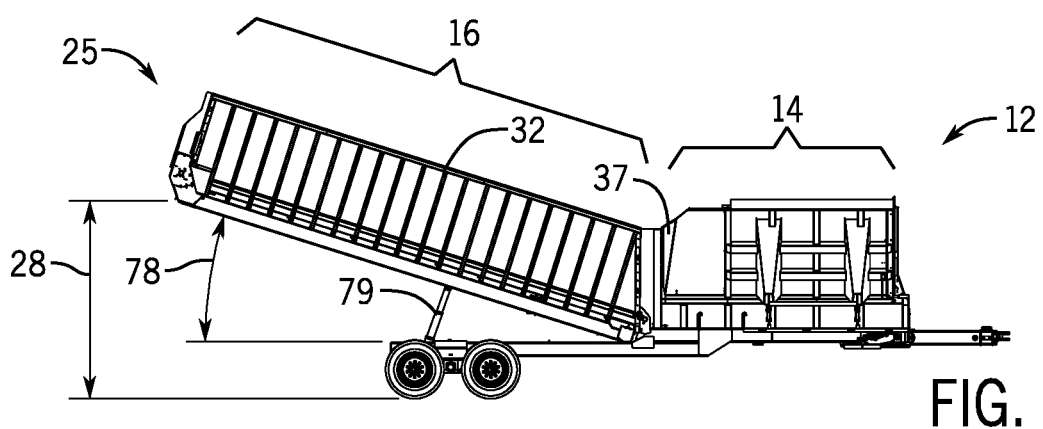

The down chute 152 may include a rear wall 154 spaced from the rear end 25 and generally perpendicular to walls 32 of the chute 16. This rear wall 154 operates to constrain a rearward trajectory of material discharged from the chute 16 to better direct it into the container 74 particularly at high discharge rates. The rear wall 154 is attached to and supported at its lateral edges by vertical sidewalls 156a and 156b serving to connect the rear wall 154 to sidewalls 32a and 32b and also to constrain sideward escape of materials and reduce the effects of wind that may cause a drifting of materials laterally. The attachment between the sidewalls 156 and respective sidewalls 32 may be by hinges 158 (only the right side hinge shown) having a horizontal hinge axis 160 allowing leveling of the down chute 152 (for example, by hydraulics not shown for clarity) when the chute 16 is in an elevated position as depicted so that the rear wall 154 is substantially vertical and the upper edges of the rear wall 154 and sidewalls 156 are even and substantially in a horizontal plane. Conversely, when the chute 16 is lowered to a horizontal position for transport, for example as shown in FIG. 7a, the down chute 152 may be elevated by pivoting about hinge axis 160 for improved road clearance.

It will be appreciated that the various hydraulic actuators of the present invention may be controlled remotely, for example, through a wireless controller controlling electric actuators switching hydraulic circuit lines appropriately. Similarly, remote control may be applied to a non-hydraulic, mechanical power takeoff drive system as well by using electrically actuable clutch mechanism. While the present invention anticipates typical embodiments will provide a wheeled chassis for transporting the invention, it will be appreciated that other transport mechanisms may be used including, for example, treads skids or the like.

Certain terminology is used herein for purposes of reference only, and thus is not intended to be limiting. For example, terms such as "upper," "lower," "above," and "below," refer to directions in the drawings to which reference is made. Terms such as "front," "back," "rear," "bottom," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features of the present disclosure and the exemplary embodiments, the articles "a," "an," "the," and "said," are intended to mean that there are one or more of such elements or features. The terms "comprising", "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 USC 112(f) unless the words "means for" or "step for" are explicitly used in the particular claim.

What we claim is:

1. An agricultural reloader for transferring crop materials from a field to an over-the-road trailer, the agricultural reloader comprising:
- a chassis transportable over a field wherein the chassis provides at least a left and right side wheel; and
- a conveyor chute extending along a longitudinal axis and supported by the chassis, the conveyor chute having upstanding sidewalls on either side of a bottom wall, the bottom wall providing a conveyor moving material within the conveyor chute over the bottom wall between the sidewalls, wherein the conveyor extends substantially the entire width between the left and right side wheels, wherein the conveyor chute provides:
  - (a) a first elevator portion pivotally attached at a proximal end to the chassis to allow, in an operating state, elevation of a distal end of the elevator portion over the trailer, and, in a transportation state, to allow lowering of the distal end of the elevator portion against the chassis; and
  - (b) a second receiver portion shorter in longitudinal length than the first elevator portion and open to receive crop material downwardly into the receiver portion between the sidewalls and in angled communication with the elevator portion in the operating state;
- wherein the conveyor operates to move crop materials received in the receiver portion longitudinally through the receiver portion to the elevator portion and out of an open distal end of the elevator portion.

2. The agricultural reloader of claim 1 wherein the elevator portion extends in cantilever beyond an end of the chassis in the operating state.

3. The agricultural reloader of claim 1 wherein bottom walls of the elevator portion and receiver portion are substantially coplanar in the transportation state.

4. The agricultural reloader of claim 1 wherein the receiver portion pivots with respect to the elevator portion about a horizontal axis.

5. The agricultural reloader of claim 1 wherein the chassis provides at least a left and right side wheel having outer wheel surfaces separated by a trailer width of no more than 8' 6" and wherein the sidewalls of the first elevator portion lie within the trailer width.

6. The agricultural reloader of claim 1 further including an actuator position between the chassis and a distal portion of the elevator to raise the elevator portion to the operating state of at least 20° upward from horizontal and lower the elevator portion to the transportation state, lower than 10° above horizontal.

7. The agricultural reloader of claim 1 wherein both the elevator portion and receiver portion of the conveyor chute are aligned along a common vertical plane when the elevator portion is in the operating state and the transportation state.

8. The agricultural reloader of claim 1 wherein the side walls of the elevator portion of the conveyor chute extend upward to a rim having a first separation perpendicular to the longitudinal axis and wherein the sidewalls of the receiver portion of the conveyor chute extend upward to a rim having a second separation perpendicular to the longitudinal axis greater than the first separation.

9. The agricultural reloader of claim 1 wherein the conveyor provides a continuous portion of a conveyor loop extending over the bottom wall of the elevator portion and receiver portion.

10. The agricultural reloader of claim 1 wherein the chassis provides a tractor hitch for connecting the chassis to a tractor to draw the chassis over a field.

11. The agricultural reloader of claim 10 wherein the tractor hitch extends longitudinally from an end of the chassis proximate to the receiver portion and is mounted to retract longitudinally toward the chassis when the receiver portion is not in use.

12. The agricultural reloader of claim 1 further including bumpers extending from the chassis at an end of the chassis supporting the receiver portion, the bumpers sized to limit travel of vehicles discharging crop materials into the receiver portion moving longitudinally toward the receiver portion.

13. The agricultural reloader of claim 1 further including a downwardly opening chute attached at a rear of the elevator portion to direct material discharged from the rear of the elevator portion downwardly.

14. An agricultural reloader for transferring crop materials from a field to an over-the-road trailer, the agricultural reloader comprising:
- a chassis transportable over a field; and
- a conveyor chute extending along a longitudinal axis and supported by the chassis, the conveyor chute having upstanding sidewalls on either side of a bottom wall, the bottom wall providing a conveyor moving material within the conveyor chute over the bottom wall between the sidewalls, wherein the conveyor chute provides:
  - (a) a first elevator portion pivotally attached at a proximal end to the chassis to allow, in an operating state, elevation of a distal end of the elevator portion over the trailer, and, in a transportation state, to allow lowering of the distal end of the elevator portion against the chassis; and
  - (b) a second receiver portion open to receive crop material downwardly into the receiver portion between the sidewalls and in angled communication with the elevator portion in the operating state;
- wherein the conveyor operates to move crop materials received in the receiver portion longitudinally through the receiver portion to the elevator portion and out of an open distal end of the elevator portion; and
- further including an actuator system for moving upper edges of the sidewalls of the receiver portion between a first transverse separation distance perpendicular to the longitudinal axis for transportation and a second transverse separation distance for receiving crop materials during use.

15. The agricultural reloader of claim 14 wherein the sidewalls of the receiver portion of the conveyor chute pivot at a lower edge adjacent to the bottom wall and wherein the actuator system pivots the sidewalls of the receiver portion inward to more closely align with sidewalls of the elevator portion of the conveyor chute in a first state and outward to provide a funneling of crop materials toward the bottom wall in a second state.

16. The agricultural reloader of claim 14 wherein the receiver portion of the conveyor chute further includes an upstanding end wall cooperating with the sidewalls of the receiver portion of the conveyor chute to retain material against escaping between the sidewalls of the receiver portion and the end wall.

17. The agricultural reloader of claim 16 wherein the end wall communicates with the sidewalls of the receiver portion through shield portions to allow movement between the sidewalls of the receiver portion and end wall while preventing an escape of materials between the sidewalls of the receiver portion and end wall with movement of the sidewalls of the receiver portion.

18. The agricultural reloader of claim 17 wherein also sidewalls of the receiver portion further include shield portions to allow movement between the sidewalls of the receiver portion and sidewalls of the elevator portion while preventing the escape of material between the sidewalls of the receiver portion and sidewalls of the elevator portion.

19. The agricultural reloader of claim 17 wherein the shield portions describe regions of overlap between the end wall and sidewalls of the receiver area.

\* \* \* \* \*